INVENTOR.
GEORGE R. BRIGGS
BY Morris A. Rabkin
ATTORNEY

Dec. 6, 1960
G. R. BRIGGS
2,963,687
MAGNETIC SYSTEMS
Filed May 1, 1957
4 Sheets-Sheet 2
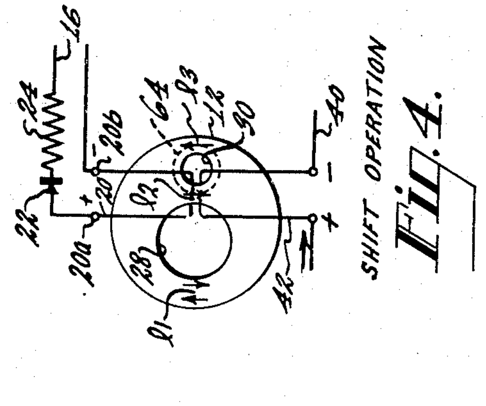
Fig. 4. SHIFT OPERATION
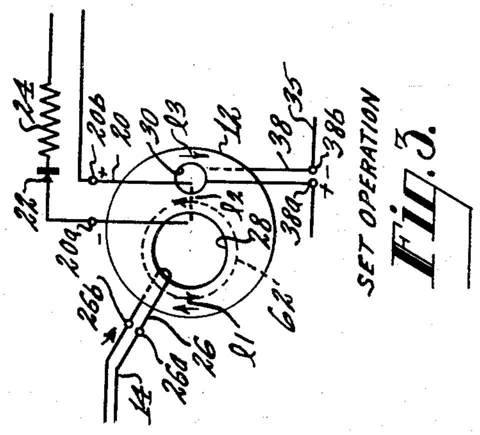
Fig. 3. SET OPERATION
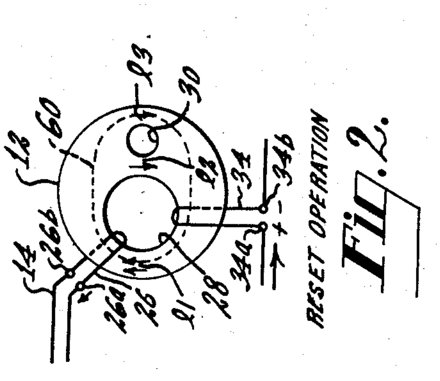
Fig. 2. RESET OPERATION
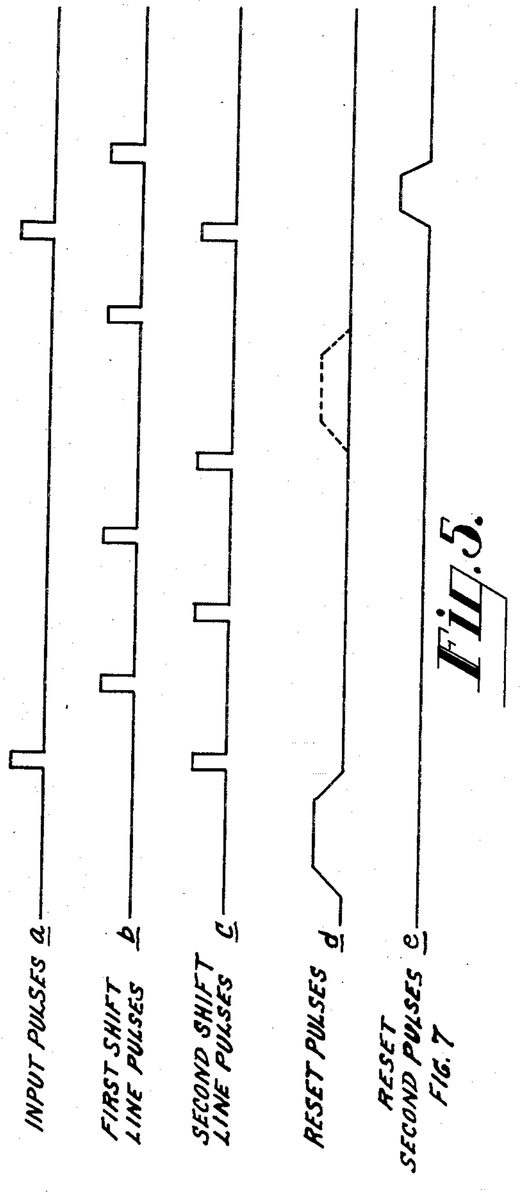
Fig. 5.
INVENTOR.
GEORGE R. BRIGGS
BY
Morris L. Rabkin
ATTORNEY Dec. 6, 1960

G. R. BRIGGS

MAGNETIC SYSTEMS 2,963,687

Filed May 1, 1957

4 Sheets-Sheet 3

INVENTOR.
GEORGE R. BRIGGS
BY Morris L. Rabkin
ATTORNEY

Dec. 6, 1960
G. R. BRIGGS
2,963,687
MAGNETIC SYSTEMS
Filed May 1, 1957
4 Sheets-Sheet 4
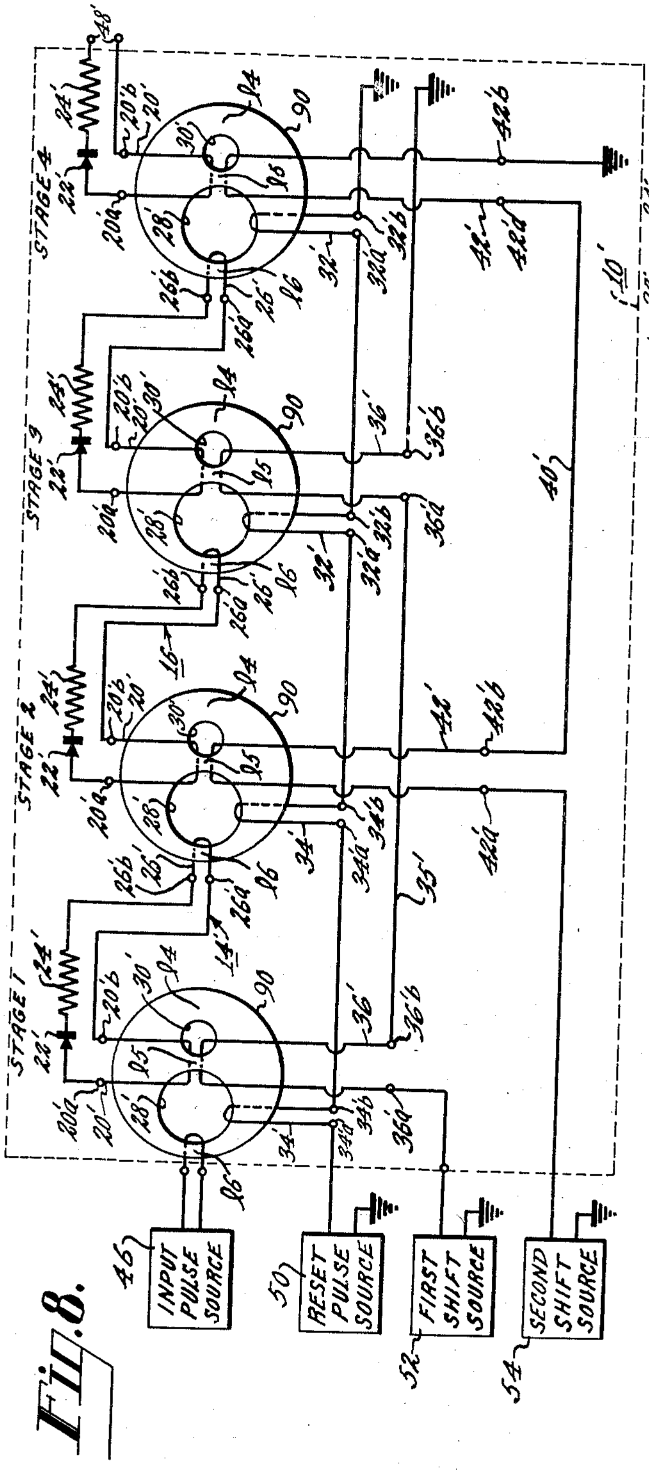
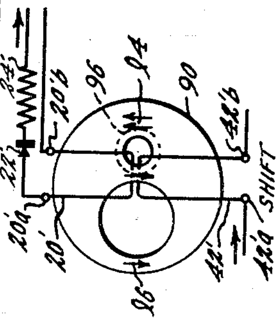
FIG. 11.
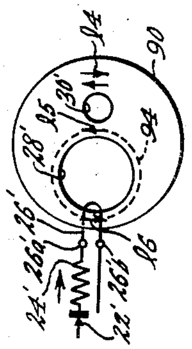
FIG. 10.
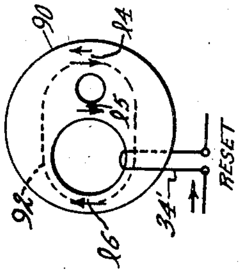
FIG. 9.
INVENTOR.
GEORGE R. BRIGGS
BY
Morris C. Rabkin
ATTORNEY 2,963,687

MAGNETIC SYSTEMS

George R. Briggs, Princeton, N.J., assignor to Radio Corporation of America, a corporation of Delaware Filed May 1, 1957, Ser. No. 656,331

14 Claims. (Cl. 340—174)

This invention relates to magnetic systems of the type which cycles a binary digit, and particularly to cyclic systems using transfluxors.

Systems of the cyclic type are used in information-handling systems for timing, for selection, for counting, and the like applications. For example, in ring counter circuits, a single binary digit, represented by one state of a bistable element, is cycled through a series of cascaded bistable elements under the control of shift signals.

It is an object of the present invention to provide improved magnetic systems of this cyclic type.

Another object of the present invention is to provide improved magnetic systems of this cyclic type, which systems are reliable and relatively efficient in operation.

An article by J. A. Rajchman and A. W. Lo, entitled "The Transfluxor," published in the March 1956 issue of the Proceedings of the I.R.E., pages 321–332, describes the construction and the operation of certain transfluxor devices.

Among other things, a transfluxor includes a core of rectangular hysteresis loop magnetic material having a plurality of apertures. A transfluxor may be arranged to provide substantially complete electrical isolation between different windings linked to its core.

In the cyclic systems of the present invention, a plurality of transfluxor cores are connected in cascade by a plurality of transfer loops, each loop including a unidirectional element and a resistive element. A binary digit stored in a lower-order core is transferred in a shift cycle to the next higher-order core by a shift signal applied to a shift means linked to all the cores. In shifting information from one core to a succeeding core, substantially no signal is induced in the transfer loop coupling the one core and the preceding core. After the information is shifted from the highest-order core, all the cores may be returned to an initial condition by a reset signal applied to a reset line linking all the cores. A ring-counter circuit may be provided by coupling the output of the highest-order core to the input of the lowest-order core.

In certain embodiments of the invention, undesired flux changes may be prevented by using a "holding" magnetomotive force (M.M.F.).

In other embodiments of the invention, novel transfluxor cores are used and no holding M.M.F. is required.

In the accompanying drawing:

Fig. 1 is a schematic diagram of a magnetic system according to the invention, using transfluxor cores;

Figs. 2, 3 and 4, respectively, are each a schematic drawing illustrating the flux orientation in one of the cores of Fig. 1 during different portions of the operating cycle;

Fig. 5 is a timing diagram useful in explaining the operation of the system of Fig. 1;

Fig. 8 is a schematic diagram of another embodiment of a cyclic system, according to the invention, using a novel type of transfluxor core; and Figs. 9, 10 and 11, respectively, are each a schematic diagram indicating the flux orientation in one of the cores of Fig. 8 during different portions of the operating cycle.

Figure 1:
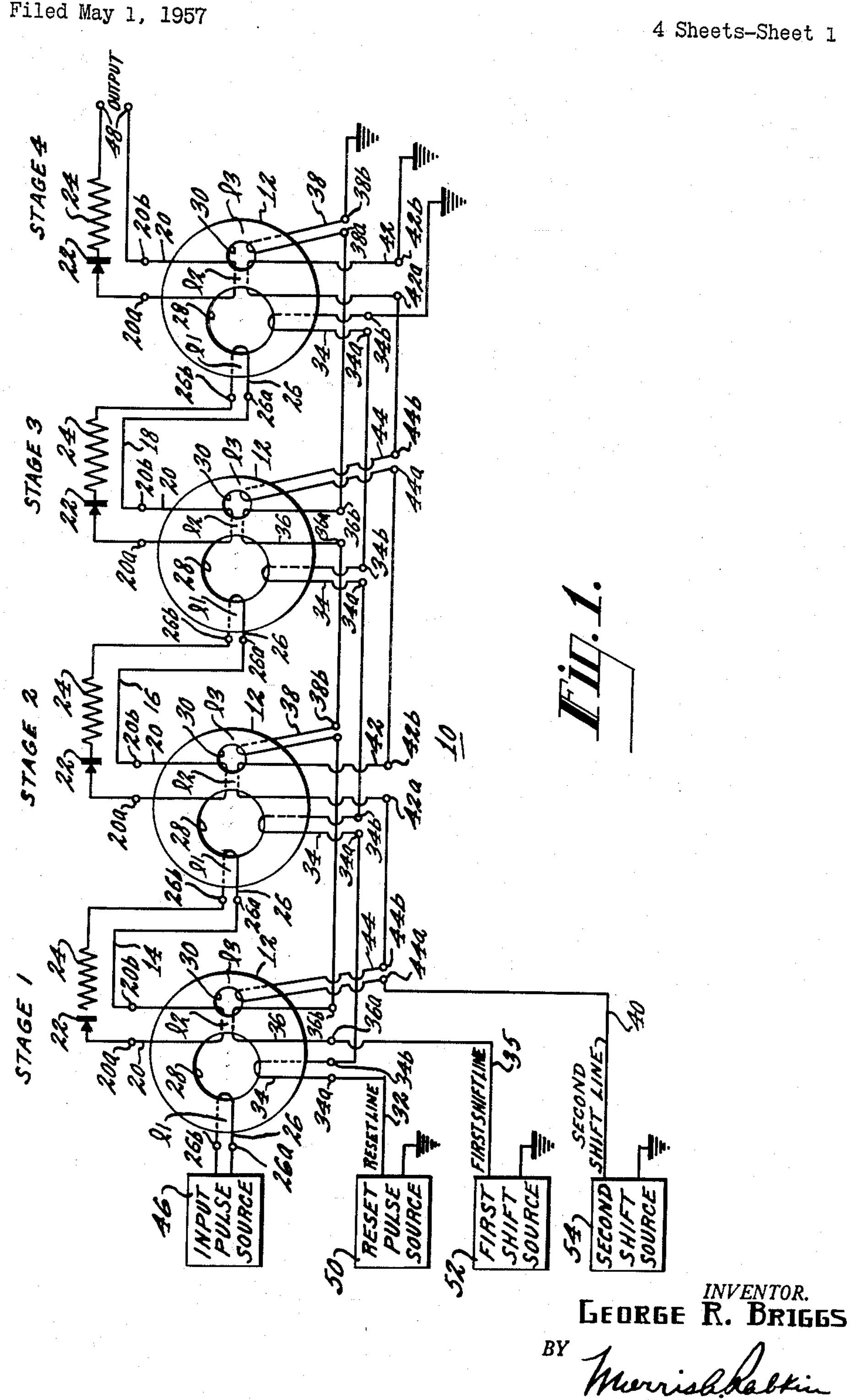

In Fig. 1, a magnetic system 10, according to the invention, has four stages designated 1, 2, 3, and 4, each stage including a core 12 having two apertures 28, 30, one, 28, being larger than the other. Each of the cores 12 is similar to the transfluxor core shown in Fig. 3 of the aforementioned article. Three transfer loops 14, 16 and 18, respectively, couple the cores 12 of stages 1 and 2, stages 2 and 3, and stages 3 and 4. The transfer loops are similar to each other and each includes an output winding 20 of one core 12 of one stage having a terminal 20$a$ connected through a unidirectional element, such as a crystal diode 22, and a resistive element, such as resistor 24, to a terminal 26$b$ of an input winding 26 of the core 12 of a succeeding stage. The other terminal 20$b$ of the output winding 20 of one core 12 is connected to the other terminal 26$a$ of the succeeding core 12 input winding 26.

Beginning at its terminal 20$a$, each output winding is brought across the top surface of a core 12, then down through the larger aperture 28, then along the bottom surface of the core 12, and up through the smaller aperture 30 to the terminal 20$b$. Each input winding 26, beginning at its terminal 26$a$, is brought across the top surface of a core 12, then down through the larger aperture 28, and then across the bottom surface of the core 12 to the terminal 26$b$. A reset line 32 links all the cores 12 by means of reset windings 34. Each reset winding 34, beginning at its terminal 34$a$, is brought across the top surface of a core 12, then down through the larger aperture 28, and then across the bottom surface to the terminal 34$b$. The terminal 34$b$ of one reset winding 34 is connected to the terminal 34$a$ of the reset winding 34 of the core 12 of the next higher-order stage. A first shift line 35 is wound on the narrow, inside legs $l_2$ (between the apertures 28 and 30) of the stage 1 and 3 cores 12 by means of separate first shift windings 36, and is wound on the narrow, outside legs $l_3$ (between the smaller aperture 30 and the core periphery) of the stage 2 and 4 cores 12 by means of separate first holding windings 38. A second shift line 40 is wound on the narrow, inside legs $l_2$ of the stage 2 and 4 cores 12 by means of separate second shift windings 42, and is wound on the narrow, outside leg $l_3$ of the stage 1 and 3 cores 12 by means of separate second holding windings 44. Each shift winding, first or second, on the core 12 of one stage is connected at its $b$ terminal to the $a$ terminal of the holding winding, first or second, on the core 12 of the next succeeding stage. The input winding 26 of the stage 1 core 12 is connected to a source 46 of input pulses. The output winding 20 of the stage 4 core 12 is connected through a crystal diode 22 and a resistor 24 to a pair of output terminals 48. The reset line 32 is connected to a source 50 of reset pulses, and the first and second shift lines 35 and 40 are connected to first and second sources 52 and 54, respectively, of shift pulses.

Four separate stages are shown for illustrative purposes, but it is understood that the system 10 may include any desired number of stages, odd or even. Any additonal stages in a system 10 are connected in the same manner as the stages 1 through 4. The output terminals 48, for example, may be connected to the terminals of the input winding 26 of a stage 5 core 12 (not shown), or they may be connected to any suitable utilization device (not shown). After linking all the cores 12, the reset line 32 and the first and second shift lines 35 and 40 are each returned to their respective sources, through a source of common reference potential, indicated in the drawing by the conventional ground symbol.

For convenience of drawing, each of the windings is shown as a single-turn winding. It is understood, however, that multi-turn windings may be used with appropriate turns ratios.

In operation, each of the cores 12 is placed in a reset condition by applying a positive reset pulse to the reset line 32. The reset pulses are illustrated by the positive pulses of line *d* of the timing diagram of Fig. 5. For reasons described more fully hereinafter, the reset pulses are applied relatively slowly compared with the input or the shift pulses. The flux orientation in any one core 12 in the reset condition, for example, the stage 2 core 12, is indicated in Fig. 2. The positive reset pulse flowing into the terminal 34*a* of the reset winding 34 produces flux in the stage 2 core 12 along the longest path, indicated by the dotted line 60, and including the legs $l_1$ and $l_3$. After the reset pulse is terminated, the legs $l_1$, $l_2$ and $l_3$ of the core 12 are saturated with flux in the clockwise sense about the large aperture 28.

The well-known "right-hand" rule may be used for determining the senses of flux in the cores 12 due to current in the various windings, and for determining the polarities of the voltages, if any, induced in the various core windings.

When all the cores 12 of Fig. 1 are in their reset condition, application of a sequence of positive pulses to the first and second shift lines 35 and 40 does not produce any flux changes in the cores 12. No flux change is produced in a reset core 12 because the narrow, inside leg $l_2$ of a reset core 12 already is saturated with flux in the direction of the M.M.F. generated by the shift winding current. The M.M.F. generated by the shift pulse current flowing in a holding winding 38 or 44 does not produce any flux change in a reset core 12 because the narrow, outside leg $l_3$ of a reset core 12 already is saturated with flux in the direction of the holding current M.M.F. The radial dimension of the aperture 28 is made relatively larger than the radial dimension of the aperture 30, say ten or more times larger. In such case, the shift pulse current flowing in a shift winding 36 or 42 generates sufficient M.M.F. to change flux in the adjacent narrow legs $l_2$ and $l_3$ of a set core 12, but insufficient to change flux in the middle leg $l_3$ and the distant wide leg $l_1$ of a set core 12, as described more fully hereinafter. The first and second shift line pulses are indicated at lines *b* and *c* of Fig. 5.

Each input signal from the input source 46 is applied to the stage 1 core 12 input winding 26 coincidentally with a second shift line pulse, as indicated at lines *a* and *c* of Fig. 5. The input signal current (conventional) flows in the input winding 26 of the stage 1 core 12 from the terminal 26*b* to the terminal 26*a* to change this core from the reset to the set condition. The set condition of a core 12 corresponds to the storage of one binary digit, for example, a binary "1" digit. The following first shift line pulse, indicated at line *b* of Fig. 5, transfers the binary digit from the stage 1 to the stage 2 core 12. The shift current pulse flowing in the shift winding 36 of the stage 1 core 12 produces a flux change in the narrow legs $l_2$ and $l_3$. This flux change induces a voltage in the output winding 20 of the stage 1 core 12 to produce a current flow in the clockwise sense in the first transfer circuit 14. The transfer current in the input winding 26 of the stage 2 core 12 produces a flux change in the wide leg $l_1$ and in the adjacent, narrow leg $l_2$ along a path indicated by the dotted line 62 of Fig. 3 to change the stage 2 core 12 from the reset to the set condition. No flux change occurs in the distant leg $l_3$ of the stage 2 core 12 because the first shift pulse current flows in the first holding winding 38 of the stage 2 core 12 in a direction to hold the leg $l_3$ in its reset condition. The flux change in the middle leg $l_2$ of the stage 2 core 12 induces a voltage in its output winding 20 in a direction to make the terminal 20*a* negative relative to its terminal 20*b*, as indicated in Fig. 3. Accordingly, substantially no current flows in the second transfer loop 16 because this induced voltage is in a direction to make the diode 22 of this transfer loop non-conductive.

The following second line shift pulse produces a flux change in the narrow legs $l_2$ and $l_3$ of the stage 2 core 12, along a path indicated by the dotted line 64 of Fig. 4. The flux change in the stage 2 core 12 induces a voltage in the stage 2 output winding 20 in a direction to make its terminal 20*a* positive relative to its terminal 20*b*. This induced voltage makes the diode 22 of the second transfer loop 16 conductive, and a relatively large transfer current is produced to change the stage 3 core 12 from its reset to its set condition. Substantially no current is inducted in the first transfer loop 14, when the binary digit is transferred from the stage 2 core 12, because substantially no flux change is produced in the wide leg $l_1$ of the stage 2 core 12. The flux in the wide leg $l_1$ is not changed because the length of the path 64, including the legs $l_2$ and $l_3$ (Fig. 4) is relatively short compared to the length of the path 62, including the legs $l_1$ and $l_2$ (Fig. 3). Substantially no flux change occurs in the narrow leg $l_3$ of the stage 3 core 12 when it is changed to its set condition, because the second shift pulse current flowing at the same time in the second holding winding 44 of the stage 3 core 12 holds the leg $l_3$ in its reset condition.

The next first shift line pulse produces a flux change in the narrow legs $l_2$ and $l_3$ of the stage 3 core 12, producing a relatively large current in the third transfer loop 18 to change the stage 4 core 12 from its reset to its set condition. The first shift line current flowing in the first holding winding 38 of the stage 4 core 12 maintains the outside leg $l_3$ in its reset condition. Substantially no voltage is induced across the second transfer loop 16 when the information is transferred from the stage 3 core 12 because substantially no flux change occurs in the wide leg $l_1$ of the stage 2 core 12 during a first shift operation.

The next second shift line pulse transfer the binary digit from the stage 4 core 12 to the output terminals 48. After the binary digit is transferred from the stage 4 core 12, a reset pulse is applied to the reset line 32 to change the flux in the outside legs $l_1$ and $l_3$ of all the cores 12 to the initial clockwise sense, as indicated in Fig. 2.

One advantage of thus deferring the resetting of the cores 12 is that more efficient operation is achieved. More efficient operation is achieved because no voltage is induced in the input winding 26 of a core 12 when a binary digit is shifted from that core 12. Accordingly, a series-resistance element is not required to be connected in the transfer loop to limit the current flow between a core 12 and its immediately preceding core 12 during a shift operation. The purpose of the resistors 24 in the transfer loops of the present invention is to limit the current flow in the transfer loops during the reset operation. Thus, during the reset operation, a voltage is induced in the input windings 26 of the cores 12 when the flux is changed in the legs $l_1$ and $l_3$ (Fig. 2) by the reset line current pulse. This induced voltage causes a current flow in the transfer loops in the clockwise direction. Such transfer loop current flow is undesirable because it opposes the reset line current pulse from completely resetting the cores 12. The resistors 24 limit the amount of current flow in the transfer loops during the reset operation. Note, however, that the slower the reset operation is carried out, the smaller are the amounts of current induced in the transfer loops. Thus, resistors 24 of relatively small ohmic value can be used when the rest operation is carried out relatively slowly. If the reset operation is sufficiently slow, sufficient series resistance may be provided by the self resistance of the transfer loop input and output windings in conjunction with the forward impedance of the crystal diode of a transfer loop.

Also note that a shift operation can be carried out as fast as desired because no undesired currents are induced in the transfer loops during a shift operation. Furthermore, the shift operation is more efficient when resistors of reduced ohmic value are used because such resistors dissipate less power than when larger ohmic-value resistors are used. Also, the ratio between the number of turns of an output winding 20 and an input winding 26 of a transfer loop can approach unity. That is, fewer turns are required for the output windings 20 when smaller resistors 24 are used because most of the flux change produced in a core 12 by a shift line pulse is transferred to the succeeding core 12.

After the information is transferred from the stage 4 core 12, and after the cores 12 are reset, a new input pulse from the input source 46 begins a new cycle of shift operations.

If desired, separate outputs may be taken from the separate cores 12 by winding additional output windings (not shown) on the narrow, inside legs $1_2$ of the cores 12. Thus, each time a binary digit is transferred from a core 12, an output signal would be induced in the additional output windings. Also, if desired, separate load devices (not shown) may be coupled in the separate transfer loops.

Figure 6:
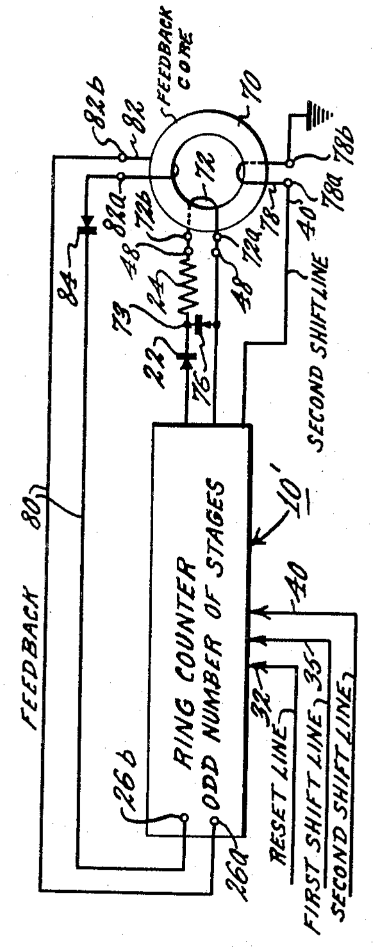
Fig. 6 is a schematic diagram of a ring-counter circuit, according to the invention, using a single-aperture core for coupling between the highest and the lowest-order stages.

An embodiment of the invention arranged as a ring counter is shown in Fig. 6. The counter 10′ of Fig. 6 is similar to the system 10 of Fig. 1 except that an odd number of stages are used. A feedback circuit, including a single-aperture core 70 and a feedback loop 80, couples the output terminals 48 to the terminals of the input winding 26 of the stage 1 core 12 of the counter 10′. The single-aperture core 70 is used to store the output of the counter 10′ until the reset operation is completed. The output terminals 48 of the counter 10′ are connected to an input winding 72 of the feedback core 70. A unidirectional conducting element, such as a crystal diode 76, is connected in shunt between the terminal **72*b* of the input winding 72 and a junction point 73 between the diode 22 and the resistance element 24. Another unidirectional conducting device 84 is connected in series in the feedback loop 80. The second shift line 40 is connected to a shift winding 78 of the feedback core 70**.

In operation, the feedback core 70 is initially reset to one of its two states of magnetization, for example, the positive state (B*r*). The feedback core 70 is placed in its positive state by a first shift line current (conventional) flowing in the shift winding 78 from the terminal **78*a* to the terminal 78*b*. In changing to the positive state, a voltage is induced across the input winding 72 and the feedback winding 82 of the feedback core 70. The voltage induced across the input winding 72 is in a direction to make the terminal 72*a* positive relative to the terminal 72*a*. An induced current flows through the shunt diode 76, the resistance element 24, and the input winding 72 of the feedback core 70. The resistance element 24 limits the amplitude of this induced current flow, and the shunt diode 76 effectively bypasses the induced current from the counter 10′. However, the voltage induced in the feedback winding 82 when the feedback core 70 is reset is in a direction to make the terminal 82*a* positive relative to the terminal 82*b*. Accordingly, the feedback diode 84 is made to conduct and a relatively large current flows in the feedback loop 80 to change the lowest-order core of the counter 10′** to its set condition.

The output signal from the output terminals 48 of the register 10′ is applied to the input winding 72 of the feedback core 70, during a first shift operation, because the counter 10′ has an odd number of stages. The output signal from the counter 10′ flows into the terminal **72*b* of the input winding 72 to change the feedback core 70** from the positive or reset state (B*r*) to the negative or set state (−B*r*). When the feedback core 70 is thus set, the voltage induced across the terminals of the feedback winding 82 is in a direction to make the crystal diode 84 of the feedback loop 80 non-conducting. Accordingly, substantially no current flows in the feedback loop 80 when the feedback core 70 is changed to its set state. After the binary digit is transferred from the counter 10′ to the feedback core 70, a reset pulse is applied to the reset line 32 to reset all the cores of the counter 10′. The next second shift line pulse succeeding the reset line pulse changes the feedback core 70 from the set to the reset state. A relatively large feedback current flows into the input winding 26 (Fig. 1) of the stage 1 core 12 of the counter 10′. The second shift current holds the outside, narrow leg $1_3$ of the stage 1 core 12 in its reset condition, as described for the cores 12 of Fig. 1. A succession of first and second shift pulses then cycles the binary digit through the counter 10′.

Figure 7:
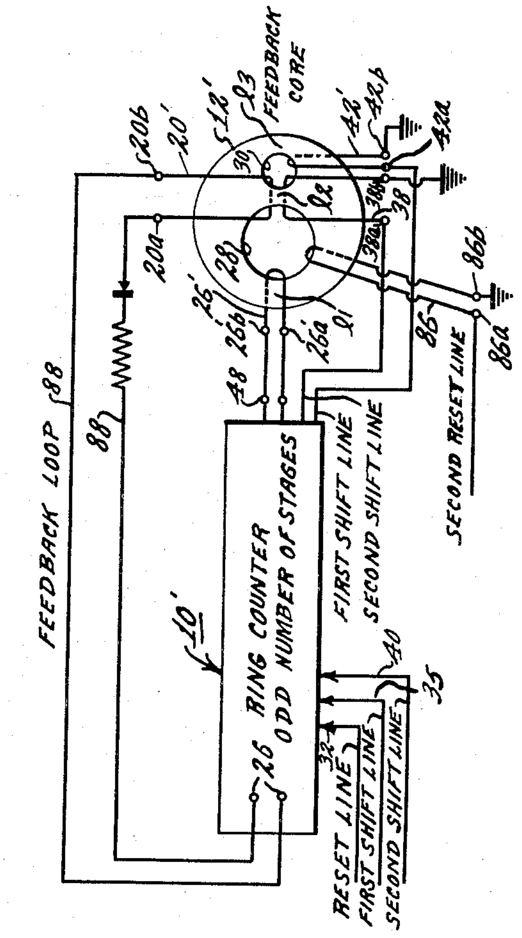
Fig. 7 is a schematic diagram of another ring-counter circuit, according to the invention, using a transfluxor core for coupling between the highest and the lowest-order stages.

Another embodiment of a ring-counter type circuit, shown in Fig. 7, uses a two-aperture transfluxor core 12′ in the feedback loop. A second shift winding 42′ is wound on the narrow, middle leg $1_2$ of the feedback core 12 ′, and a first holding winding 38′ is wound on the narrow, outside leg $1_3$ of the feedback core 12′. A second reset winding 86 is wound on the wide, outside leg $1_1$ of the feedback core 12′. The output terminals 48 of the counter 10′ are connected to the input winding 26′ of the feedback core 12′. A feedback loop 88, arranged similarly to the transfer loops of the system 10 (Fig. 1), connects the output winding 20′ of the feedback core 12′ (Fig. 7) to the input winding 26 of the stage 1 core 12 of the counter 10′.

In operation, the feedback core 12′ is initially in its reset conditon. The feedback core 12′ is reset by applying a second reset pulse from any suitable source, not shown, to the second reset winding 86. The feedback core 12′ is changed to its set condition by a transfer current flowing in its input winding 26 when the binary digit is shifted from the highest-order stage of the counter 10′. Because the counter 10′ has an odd number of stages, the feedback core 12′ is changed to its set condition during a first shift operation. The first shift line current flowing in the first holding winding 38′ of the feedback core 12′ holds the outside leg $1_3$ in its reset condition. Following this first shift line pulse, a reset pulse is applied to the reset line 32 to reset all the cores 12 of the counter 10′. The next second shift line pulse succeeding the reset pulse produces a flux change in the narrow legs $1_2$ and $1_3$ of the feedback core 12′, and returns the binary digit to the stage 1 core 12 of the counter 10′. Following the latter second shift line pulse, a second reset pulse is applied to the second reset winding 86 of the feedback core 12′ to return it to its reset condition. A second reset line pulse is indicated by the positive pulse of line *e* of Fig. 5. The second reset line pulse can be applied at any time between the termination of the second shift line pulse used to transfer the binary digit from the feedback core 12′ and the initiation of the next first shift line pulse used to transfer the binary digit to the feedback core 12′.

Fig. 8 is a schematic diagram of another embodiment of a cyclic system, according to the invention, using two-aperture cores 90, each having a wide leg $1_4$ located between the smaller aperture 30′ and the periphery of the core 90. The narrow, middle leg $1_5$ and the narrow, outside leg $1_6$ adjacent the larger aperture 28′ are each of substantially equal cross-sectional area. The wide leg $1_4$ has a cross-sectional area approximately twice that of either one of the equal legs $1_5$ and $1_6$. The arrangement of the system of Fig. 8 is similar to the shift register of Fig. 1 except that no holding windings are employed. The first shift line 35′ is wound on the middle legs $1_5$ of the stage 1 and 3 cores 90, and the second shift line 40′ is wound on the middle legs $1_5$ of the stage 2 and 4 cores 90.

The operation of the system of Fig. 8 is similar to the system of Fig. 1. During a reset operation, flux in a core 90 is changed along the longest path, including outside legs $l_6$ and $l_4$, as indicated by the dotted line 92 of Fig. 9.

In the reset condition, the flux in a core 90 is oriented in the clockwise sense, with reference to the larger aperture 28', in both the narrow legs $l_5$ and $l_6$, and in the outer half of the wide leg $l_4$. However, the flux is oriented in the inner half of the wide leg $l_4$ in the counterclockwise sense, with reference to the larger aperture 28'.

A core 90 is changed from its reset to its set condition by applying a current to its input winding 26' in a direction of flow (conventional) from the terminal 26'*b* to the terminal 26'*a*. The current thus applied to the input winding 26' of a core 90 produces a flux change in the narrow legs $l_5$ and $l_6$ along a path indicated by the dotted line 94 of Fig. 10. Substantially no flux change is produced in the inner half of the wide leg $l_4$ because substantially all the flux change in the narrow, outside leg $l_6$ is absorbed by the narrow, inside leg $l_5$. Thus, no matter what amplitude of input current is applied, the flux change occurs only in the narrow legs $l_5$ and $l_6$ along the shorter path 94 (Fig. 10). Accordingly, no holding M.M.F. need be applied to hold the distant, wide leg $l_4$ in its initial reset condition.

A shift pulse applied to a set core 90 produces a flux change in the middle leg $l_5$ and in the inner half of the wide leg $l_1$, along a path indicated by the dotted line 96 of Fig. 11. Substantially no flux change occurs in the distant, outside leg $l_6$ during the shift operation for the same reason that no flux is changed in the wide leg $l_1$ of the cores 12 of Fig. 1 during a shift operation. Accordingly, substantially no current is induced in a transfer loop coupling a set core 90 and its preceding core 90 during a shift operation.

A succession of first and second shift signals successively cycles a binary digit from one core 90 to a higher-order core 90. After the information is shifted from the stage 4 core 90, a positive reset pulse is applied to the reset line 32'. The reset line pulse produces a flux change in the narrow, outside leg $l_6$ and in the inner half of the wide leg $l_4$ in each core 90, as indicated by the dotted line 92 of Fig. 9.

As in the previously described systems, the reset operation is carried out relatively slowly to reduce the amount of undesired transfer loop current produced during the reset operation. However, the shift operations can be carried out as fast as desired, as in the system of Fig. 1.

The output terminals 48' of the system of Fig. 8 may be connected by any suitable feedback means to the input winding 26 of the stage 1 core 90, as described for the counters of Figs. 6 and 7.

There have been described herein improved magnetic systems of the cyclic type, which systems operate to cycle a binary digit through a series of cascaded transfluxors. The output of the last stage of the system may be fed back by means of a single-aperture core, or by means of another transfluxor, to the input of the first stage of the system.

In the system of Fig. 1, holding magnetizing forces are used to inhibit undesired flux changes in the transfluxors when the binary digit is being transferred from one stage to a succeeding stage. In the system of Fig. 8 using novel transfluxor cores, no holding magnetizing forces are required.

If desired, individual output windings (not shown) may be wound on the middle legs of the transfluxor cores for obtaining individual outputs during a shifting operation. Also, if desired, individual load devices (not shown) may be connected in series or in parallel in the respective transfer loops.

The systems of the present invention are relatively efficient in operation because relatively small series-resistance elements may be used in the transfer loops and, accordingly, relatively small amounts of power are dissipated across the series-resistance elements during operation.

What is claimed is:

1. A magnetic circuit comprising a plurality of transfluxors each having first and second apertures, a plurality of transfer circuits connecting said transfluxors in cascade, one transfer circuit being linked through said first and second apertures of a first of said transfluxors and through said first aperture of a second of said transfluxors, another transfer circuit being linked through said first and second apertures of said second transfluxor and through said first aperture of a third of said transfluxors, and so on, each said transfer circuit including a separate unidirectional conducting element and a separate resistance element connected in series with each other, shift means linking all said transfluxors for shifting an information signal from any one said transfluxors to the transfluxor succeeding said one transfluxor, and a reset line linking all said transfluxors through said first apertures thereof.

2. A magnetic circuit as claimed in claim 1, said first and second aperture walls of each said transfluxor defining three legs, a first of said legs including the material between the inner wall of said first aperture and the periphery of said core, a second of said legs including the material between the inner walls of said first and second apertures, and the third of said legs including the material between the inner wall of said second aperture and the periphery of said core, said first and second legs being of substantially equal cross-sectional area, and said third leg having a cross-sectional area at least equal to the sum of the cross-sectional areas of said first and second legs.

3. A magnetic circuit as claimed in claim 1, said first and second aperture walls of each said transfluxor defining three legs, a first of said legs including the material between the inner wall of said first aperture and the periphery of said core, a second of said legs including the material between the inner walls of said first and second apertures, and the third of said legs including the material between the inner wall of said second aperture and the periphery of said core, said second and third legs being of susbtantially equal cross-sectional area, and said first leg having a cross-sectional area at least equal to the sum of the cross-sectional areas of said first and second legs.

4. A magnetic circuit comprising a plurality of transfluxors each having first and second apertures, a plurality of transfer circuits connecting said transfluxors in cascade, one transfer circuit being linked through said first and second apertures of a first of said transfluxors and through said first aperture of a second of said transfluxors, another transfer circuit being linked through said first and second apertures of said second transfluxor and through said first aperture of a third of said transfluxors, and so on, a first shift means linking alternate ones of said transfluxors through said first and second apertures thereof and linking other alternate ones of said transfluxors through said second apertures thereof, and second shift means linking said alternate ones of said transfluxors through said second apertures thereof and linking said other alternate ones of said transfluxors through said first and second apertures thereof.

5. A magnetic circuit comprising a plurality of transfluxors each having first and second apertures, a plurality of transfer circuits connecting said transfluxors in cascade, one transfer circuit being linked through said first and second apertures of a first of said transfluxors and through said first aperture of a second of said transfluxors, another transfer circuit being linked through said first and second apertures of said second transfluxor and through said first aperture of a third of said transfluxors, and so on, each said transfer circuit including a separate unidirectional conducting element and a separate resistance element connected in series with each other, and a reset means linking all said transfluxors through said first apertures thereof.

6. A magnetic circuit comprising a plurality of transfluxors each having first and second apertures, a plurality of transfer circuits connecting said transfluxors in cascade, one transfer circuit being linked through said first and second apertures of a lower order one of said transfluxors and through said first aperture of a succeeding higher order one of said transfluxors, another transfer circuit being linked through said first and second apertures of said higher order transfluxor and through said first aperture of the next higher order one of said transfluxors, and so on, and means including a magnetic core coupling the output of the highest order one of said transfluxors to the input of the lowest order one of said transfluxors.

7. A magnetic circuit as claimed in claim 6, said magnetic core having first and second apertures and having an input and an output winding linked thereto, said magnetic circuit having an output and an input, said circuit output being coupled to said input winding and said output winding being coupled to said circuit input.

8. A magnetic circuit as claimed in claim 6, including a first shift means linking alternate ones of said transfluxors, and a second shift means linking the other alternate ones of said transfluxors and further linking said magnetic core.

9. A magnetic circuit as claimed in claim 6, said magnetic core being a multi-apertured core having first and second apertures, and said magnetic circuit further including first shift means linking alternate ones of said transfluxors and further linking said magnetic core through said second aperture thereof, and second shift means linking the other alternate ones of said transfluxors and further linking said magnetic core through said first and second apertures thereof.

10. A magnetic circuit as claimed in claim 6, said magnetic core having first and second apertures, and said circuit further including first shift means linking alternate ones of said transfluxors and further linking said magnetic core through said second aperture thereof, second shift means linking the other alternate ones of said transfluxors and linking said magnetic core through said first and second apertures thereof, a first reset line linking all said transfluxors through said first apertures thereof and another reset line linking said magnetic core through said first aperture thereof.

11. For use in a magnetic circuit, the combination comprising a magnetic core of substantially rectangular hysteresis loop material having first and second apertures, said first aperture being of relatively large dimension compared to said second aperture, said aperture walls defining three legs, a first of said legs being located between the periphery of said core and said first aperture wall, a second of said legs being located between said first and second aperture walls, and the third of said legs being located between the periphery of said core and said second aperture wall, said first and second legs being of substantially equal cross-sectional area, and said third leg having a cross-sectional area at least equal to the sum of the cross-sectional areas of said first and second legs, input and reset windings each linked to said core through said first aperture, and shift and output windings each linked to said core through both said first and second apertures.

12. A magnetic core as claimed in claim 11, wherein the axes of said first and second apertures are substantially parallel to each other.

13. A magnetic core as claimed in claim 11, including a unidirectional conducting means connected to said output winding and poled in a direction to oppose a current flow in said output winding when said flux change is produced in said first and second legs.

14. A magnetic circuit including a core of substantially rectangular hysteresis loop material having first and second circular-shaped apertures, said first aperture having a diameter substantially large compared to the diameter of said second aperture, said aperture walls defining three legs, a first of said legs including the material between the inner wall of said first aperture and the periphery of said core, a second of said legs including the material between the inner walls of said first and second apertures, and the third of said legs including the material between the inner wall of said second aperture and the periphery of said core, said first and second legs being of substantially equal cross-sectional area, and said third leg having a cross-sectional area at least equal to the sum of the cross-sectional areas of said first and second legs, an input winding wound on said first leg for producing a flux change in said first and second legs from an initial to the other direction of magnetization, an output winding wound on said second leg and having a voltage induced therein when a flux change is produced in said second leg, another winding wound on said second leg for producing a flux change in said second and said third legs, and still another winding wound on said first leg for producing a flux change in said first and third legs.

References Cited in the file of this patent

UNITED STATES PATENTS 2,803,812 Rajchman ------------ Aug. 20, 1957

OTHER REFERENCES

Rajchman: "Proceedings of the I.R.E.," March 1956, pp. 321–332.

UNITED STATES PATENT OFFICE
CERTIFICATION OF CORRECTION

Patent No. 2,963,687 December 6, 1960

George R. Briggs

It is hereby certified that error appears in the above numbered patent requiring correction and that the said Letters Patent should read as corrected below.

Column 4, line 18, for "inducted" read -- induced --; line 74, for "rest" read -- reset --.

Signed and sealed this 30th day of May 1961.

(SEAL)
Attest:

ERNEST W. SWIDER
Attesting Officer

DAVID L. LADD
Commissioner of Patents